Sept. 20, 1938.                    C. H. BARBER                        2,130,334
                                  DISPLAY DEVICE
                              Filed Sept. 22, 1936              3 Sheets—Sheet 1

INVENTOR
C. H. BARBER
BY J. owden O'Brien
ATTORNEY.

Sept. 20, 1938.                C. H. BARBER                2,130,334
                              DISPLAY DEVICE
                          Filed Sept. 22, 1936            3 Sheets-Sheet 2

INVENTOR.
C. H. BARBER.
BY Lowden O'Brien
ATTORNEY.

Sept. 20, 1938.　　　　C. H. BARBER　　　　2,130,334
DISPLAY DEVICE
Filed Sept. 22, 1936　　　3 Sheets-Sheet 3

INVENTOR
C.H.BARBER

BY Jowden O'Brien

ATTORNEY.

Patented Sept. 20, 1938

2,130,334

UNITED STATES PATENT OFFICE 2,130,334

DISPLAY DEVICE

Charles Henry Barber, Manchester, England

Application September 22, 1936, Serial No. 102,007
In Great Britain September 27, 1935

6 Claims. (Cl. 211—93)

This invention relates to improvements in vertical display stands of the type provided with shelves adapted to fold flush into the surface of the stand for transport purposes.

Such shelves have hitherto been connected to the stand by metal or other hinges made separate from the stand or shelf which are unsightly and the object of the present invention is to provide a shelf or shelves for a display stand in which the hinge is formed integrally with the stand and shelf.

According to the invention the shelf is cut from, or moulded to fit bodily into an aperture in the stand, projections on the stand cooperating with complementary recesses in the shelf to form a hinge about which the shelf pivots and a support on the back of the stand to prevent the shelf from moving through more than a predetermined angle.

The invention will be described with reference to the accompanying drawings.

The display stand A is preferably formed from plywood or it may be formed from cardboard, metal, glass or other suitable material with shelves B cut therefrom or moulded or shaped to fit bodily when closed up into apertures in the stand.

Figure 1:
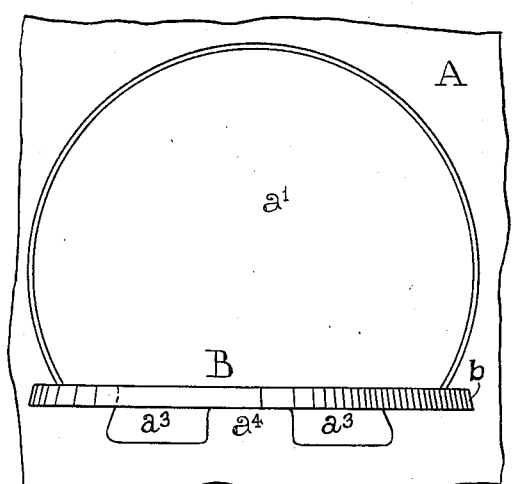
Fig. 1 is a front elevation of part of stand A with shelf B in the display position.
Figure 2:
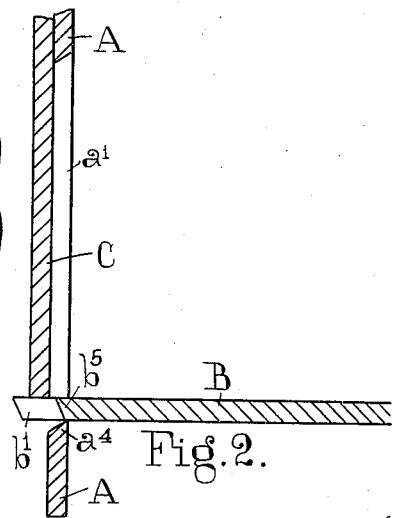
Fig. 2 is a transverse section of same.

The shelf B is formed with a bevelled edge $b$ as shown in Fig. 1, a similarly bevelled edge $a$ being formed on the edges of the aperture $a^1$ in the sheet or stand A from which it is cut or into which it fits to prevent the shelf B from being lifted therefrom from the back.

Figure 3:
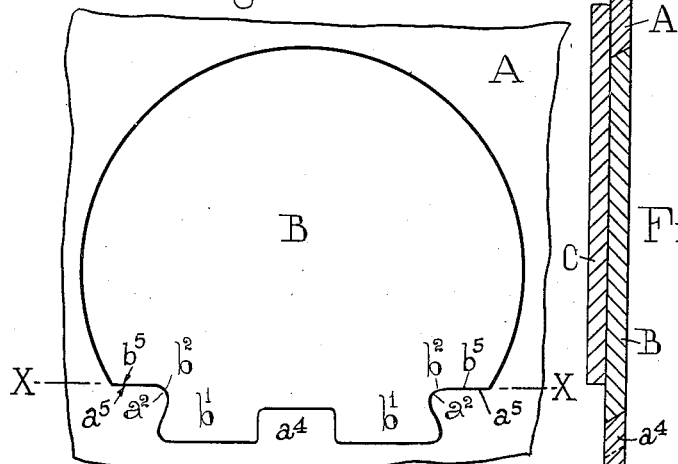
Fig. 3 is a front elevation of same with shelf B in the closed position.
Figure 4:
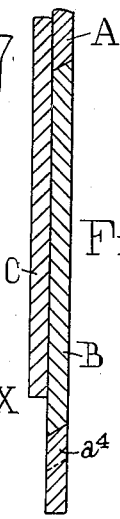
Fig. 4 is a transverse section of same.
Figure 5:
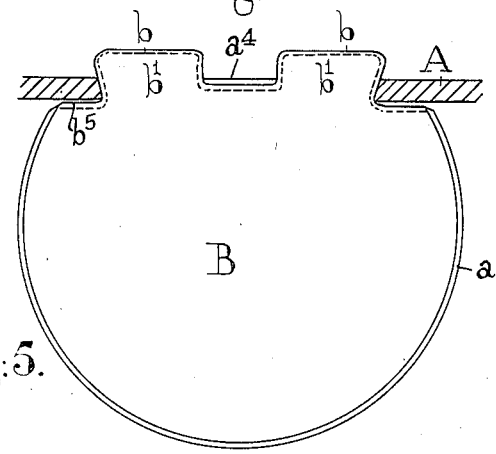
Fig. 5 is a plan of shelf B in the display position.

The lower edge $b^5$ of the shelf B is formed with a projection or projections $b^1$ fitting into recesses $a^3$ in the stand A when the shelf is closed. The lower edge $b^5$ including the projection or projections $b^1$ and corresponding edge $a^5$ of the stand A including the recesses $a^3$ are formed with a reverse bevel to that of the edges $a$ and $b$ respectively thus allowing the portion of the shelf above the line X—X Fig. 3 to move forwardly in relation to the surface of the stand whilst the projection or projections $b^1$ below this line can only move rearwardly thereof. A concave recess or recesses $b^2$ is or are formed between the shelf B and the projection or projections $b^1$ engaged by a convex portion or portions $a^2$ on the stand to act as a hinge for the shelf and to prevent it from being drawn completely away from the stand A when pivoted out of the plane of the surface.

The shelf B when in the open position is prevented from dropping into the recess or recesses $a^3$ by the bevelled edges $b^2$ of the shelf resting on the bevel on the edge $a^2$ of the stand. In order that the weight of the shelf B and its contents shall not be entirely carried by the bevel edges $a^2 b^2$ an additional support $a^4$ may be formed in the surface of the stand A, the thickness of the shelf B below the line X—X about which the shelf pivots, to support the shelf on the underside as shown in Fig. 1.

To prevent the shelf B from pivoting forward through more than a predetermined angle a support C is provided on the back of the stand A with its lower edge, adapted to be engaged by the projection or projections $b^1$ on the shelf when this latter is open. The support C may extend over the whole of the aperture $a^1$ in the stand as shown or it may be in the form of a rod or bar extending horizontally from side to side of the aperture $a^1$ with its lower edge at substantially the level of the upper surface of the shelf B and engaged by the projections $b^1$. For example, when the stand is arranged vertically the lower edge of the support C is arranged at the level of the line X—X Fig. 3 to allow the shelf B to pivot into a horizontal position. Or the support C may be arranged to allow the shelf to assume any other desired inclination.

Figure 11:
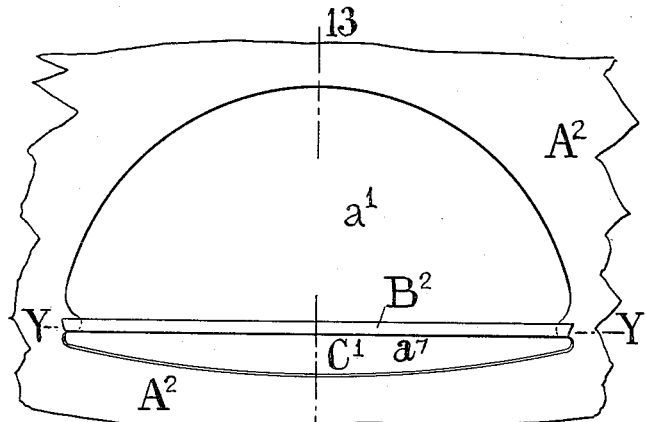
Fig. 11 is a front elevation of a modified display stand $A^2$ with shelf $B^2$ in the display position.
Figure 13:
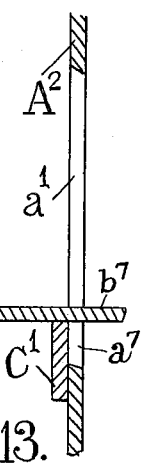
Fig. 13 is a section on line 13—13 Fig. 11.
Figure 12:
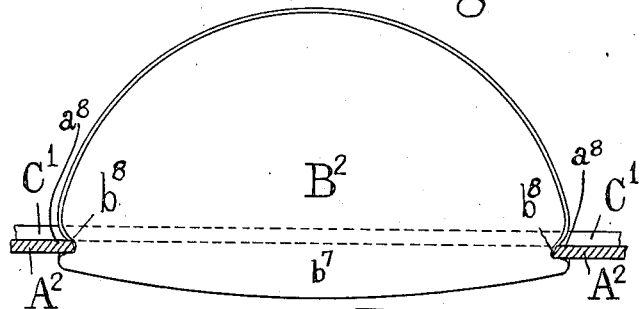
Fig. 12 is a plan of same.

In a modification shown in Figs. 11 to 15 the shelf $B^2$ is adapted to open rearwardly, the edges of the shelf and of the stand $A^2$ being bevelled in the reverse directions to those shown in Figs. 1 to 10, i. e., the shelf $B^2$ is capable of pivoting rearwardly about the line Y—Y Fig. 11 as shown in Fig. 13 whilst the downwardly projecting portion $b^7$ thereof pivots forwardly.

Figure 14:
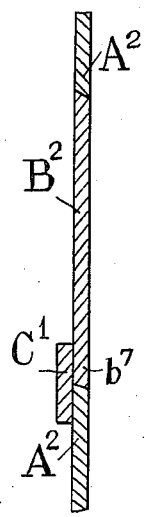
Fig. 14 is a section of same in the closed position.
Figure 15:
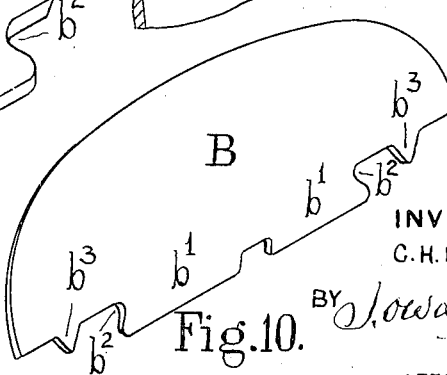
Fig. 15 shows detail perspective views enlarged of part of shelf $B^2$ and stand $A^2$.
Figures 6, 7:
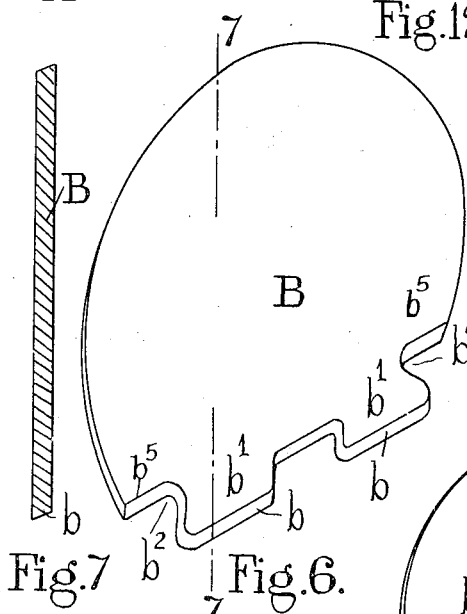
Fig. 6 is a perspective view of shelf B.
Fig. 7 is a section on line 7—7 Fig. 6.

The shelf $B^2$ and projection $b^7$ are cut from the stand $A^2$ and when in the closed position, Fig. 14, lie in the plane of the stand. The bevel on the edges of the concave recesses $b^8$ on the shelf and co-operating with the bevel on the correspondingly convex edges $a^8$ of the stand prevents the shelf $B^2$ from being lifted from the stand when the shelf is in an inclined or horizontal position and a support $C^1$ on the back of the stand prevents the shelf $B^2$ from falling into the recess $a^7$ in the stand. The upper edge of the support $C^1$ may be arranged to allow the shelf $B^2$ to assume any desired inclination when open but is preferably level with the line Y—Y Fig. 11 to enable the shelf to assume a horizontal position as shown in Figs. 11 and 13.

Figure 10:
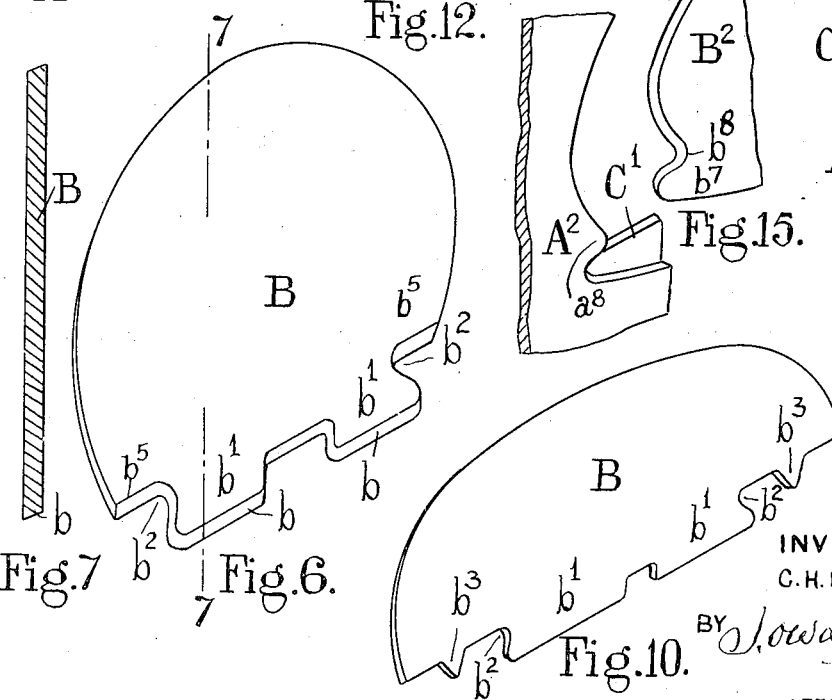
Fig. 10 is a perspective view of shelf B provided with additional supports $b3$.

In the case of long shelves instead of providing portions $b^1$, $b^7$ extending substantially the length of the shelf U or V-shaped projections or supports $b^3$ adapted to bear on the lower edge of the suport C may be provided as shown in Fig. 10 which prevent any tendency of the shelf to sag in the middle when in use.

Figure 16:
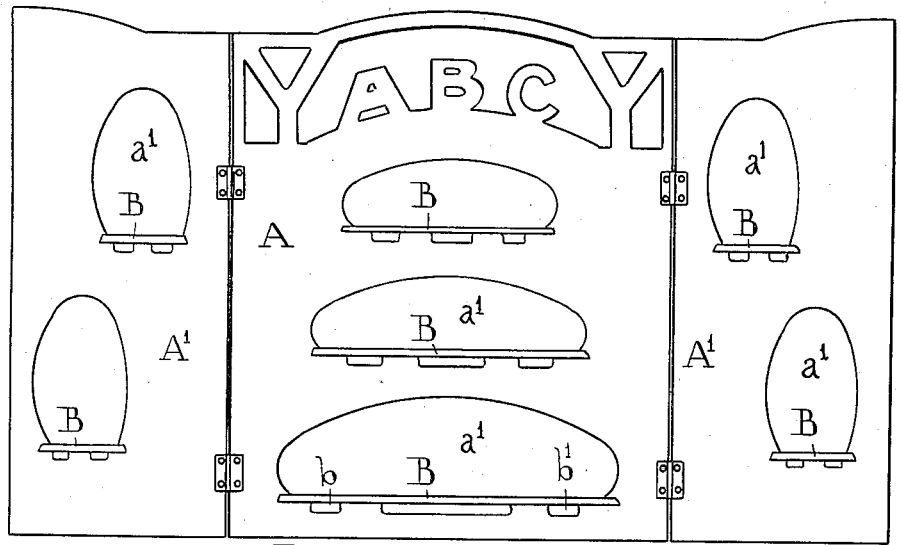
Fig. 16 is a front elevation of stand $AA^1$.
Figures 17, 18:
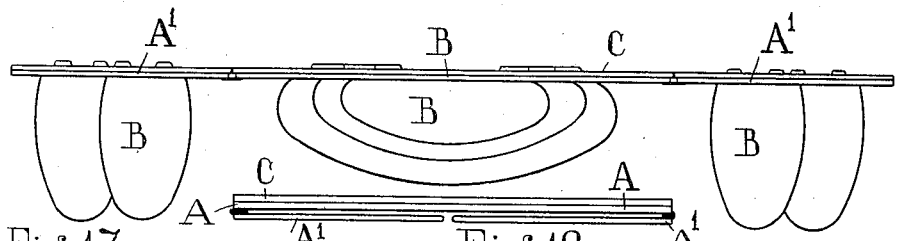
Fig. 17 is a plan of same.
Fig. 18 is a plan showing the wings $A^1$ and the shelves B in the closed position.
Figure 8:
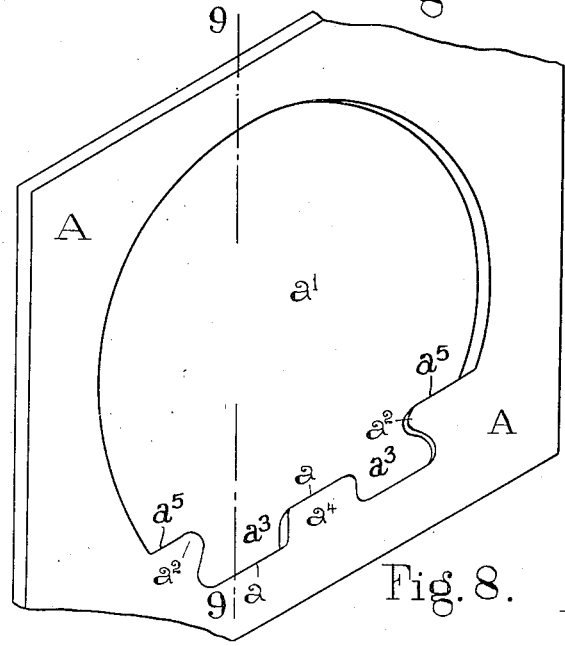
Fig. 8 is a perspective view of part of stand A showing the aperture for the shelf.
Figure 9:
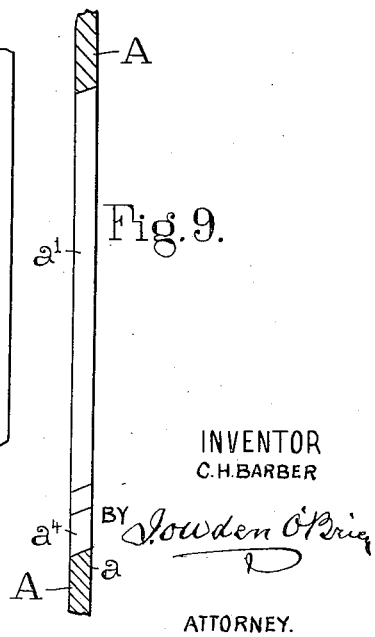
Fig. 9 is a section on line 9—9 Fig. 8.

The shelf or shelves B or $B^2$ may be formed of any desired ornamental shape or configuration and the stand A may be constructed with a single panel supported by a rear leg or in the form of a plurality of panels such as $A^1$, A, $A^1$ Figs. 16 and 17, hinged or otherwise connected together capable of being folded flat on to each other, as in Fig. 18, for storage or transport purposes.

What I claim as my invention and desire to protect by Letters Patent is:

1. A display stand of the type referred to comprising a stand, a shelf adapted to enter bodily into an aperture in and lie flush with the surface of the stand when the shelf is in the collapsed position, projections on the shelf co-operating with complementary recesses in the stand to form a hinge about which the shelf pivots and a support on the back of the stand for engagement with the shelf to prevent the shelf from moving through more than a predetermined angle.

2. A display stand of the type referred to comprising a stand, a shelf adapted to enter bodily into an aperture in and lie flush with the surface of the stand when the shelf is in the collapsed position, projections on the shelf having concave portions interacting with complementary convex portions on the stand to form a hinge about which the shelf pivots and a support on the back of the stand for engagement with the shelf to prevent the shelf from moving through more than a predetermined angle.

3. A display stand of the type referred to comprising a stand, a bevelled shelf adapted to enter a complementary bevelled aperture in and lie flush with the surface of the stand when the shelf is in the collapsed position, concave bevelled portions on the shelf interacting with complementary bevelled portions on the stand to form a hinge line about which the shelf pivots, the bevel on the shelf and stand below the hinge line being in the reverse direction from that above the hinge line to allow the upper part of the shelf above such line to move in one direction and the lower part below such line to move in the opposite direction thereby preventing the shelf from being withdrawn from the stand and a support on the back of the stand for engagement with the shelf to prevent the shelf from moving through more than a predetermined angle.

4. A display stand of the type referred to comprising a stand, a bevelled shelf adapted to enter a complementary bevelled aperture in and lie flush with the surface of the stand when the shelf is in the collapsed position, two concave bevelled portions one at each end of the shelf interacting with two complementary bevelled portions on the stand to form a hinge line about which the shelf pivots, the bevel on the shelf and stand below the hinge line being in the reverse direction from that above the hinge line to allow the upper part of the shelf above such line to move in one direction and the lower part below such line to move in the opposite direction thereby preventing the shelf from being withdrawn from the stand and a support on the back of the stand for engagement with the shelf to prevent the shelf from moving through more than a predetermined angle.

5. A display stand as in claim 4 having a portion on the stand intermediate the two complementary bevelled portions extending horizontally the thickness of the shelf below the hinge line to form an additional support for the shelf.

6. A display stand as in claim 4 having V shaped projections on the shelf extending below the hinge line to prevent sagging in the case of long shelves.

CHARLES HENRY BARBER.